United States Patent [19]

Young

[11] Patent Number: 4,816,287

[45] Date of Patent: * Mar. 28, 1989

[54] OPTICAL RECORDING MEDIA WITH THERMAL INSULATION AND METHOD OF MAKING THE MEDIA

[75] Inventor: Peter L. Young, South Barrington, Ill.

[73] Assignee: Optical Materials, Inc., Mercer Island, Wash.

[*] Notice: The portion of the term of this patent subsequent to Oct. 11, 2005 has been disclaimed.

[21] Appl. No.: 771,281

[22] Filed: Aug. 30, 1985

[51] Int. Cl.$^4$ .............................................. B05D 5/06
[52] U.S. Cl. ....................................... 427/162; 427/269
[58] Field of Search ................................ 427/162, 269; 346/135.1

[56] References Cited

U.S. PATENT DOCUMENTS

| | | | |
|---|---|---|---|
| 4,013,532 | 3/1977 | Cormia | 204/298 |
| 4,137,194 | 1/1979 | McCune | 252/316 |
| 4,216,501 | 8/1980 | Bell | 369/109 |
| 4,278,756 | 7/1981 | Bouldin | 430/414 |
| 4,314,260 | 2/1982 | Drexler | 346/76 L |
| 4,329,697 | 5/1982 | Bell | 346/135.1 |
| 4,397,923 | 8/1983 | Yasuda | 427/162 |
| 4,579,807 | 4/1986 | Blonder | 430/269 |

OTHER PUBLICATIONS

A. E. Bell and R. A. Bartolini "High-Performance Te Trilayer for Optical Recording" Appl. Phys. Lett. 34 (4) 15 Feb. 1979, pp. 275-276.
A. E. Bell and F. W. Spong "Antireflection Structures for Optical Recording" IEEE Journal of Quantum Electronics, vol. QE-14, No. 7, Jul. 1978 pp. 487-495.
Lou et al., "Bit Oriented Optical Storage With Thin Tellurium Films", J. Vac. Sci. Technol., 18(1), Jan./Feb. 1981, pp. 78-86.
Howe, et al., "Solvent-Coated Organic Materials for High-Density Optical Recording", J. Vac. Sci. Technol., 18(1), Jan./Feb. 1981, pp. 92-99.
Drexler, "DREXON TM Optical Memory Media for Laser Recording and Archival Data Storage", J. Vac. Sci. Technol., 18(1), Jan./Feb. 1981, pp. 87-91.
Craighead et al., "Microscopically Textured Optical Storage Media", Appl. Phys. Lett. 39(7), 10/1/81, pp. 532-534.
Yoshida et al., "Optical Video Recorder Using Tellurium Sub-Oxide Thin Film Disk", SPIE vol. 329, Optical Disk Technology (1982), pp. 40-45.
Jipson et al., "Laser Writing of Discontinuous Metal Films", Appl. Phys. Lett. 43(1), 7/1/83, pp. 27-29.
Freese et al., "Characteristics of Bubble-Forming Optical Direct-Read-After-Write (DRAW) Media", SPIE vol. 329, Optical Disk Technology (1982), pp. 174-180.
Lehmann et al., "Dry Etching for Pattern Transfer", J. Vac. Sci. Technol., 17(5), Sep./Oct. 1980, pp. 1177-1183.
Hudson, "Ion Beam Texturing", J. Vac. Sci. Technol., vol. 14, No. 1, Jan./Feb. 1977, pp. 286-289.
Craighead et al., "Textured Thin-Film Si Solar Selective Absorbers Using Reactive Ion Etching", Appl. Phys. Lett. 37(7), 10/1/80, pp. 653-655.

Primary Examiner—Shrive Beck
Assistant Examiner—Vi Duong Dang
Attorney, Agent, or Firm—Mason, Kolehmainen, Rathburn & Wyss

[57] ABSTRACT

An optical recording media having a thermally insulating film to minimize heat loss wherein the thickness of the film is not critical for recording. The thermally insulating film is disposed between a metal coated substrate and a dielectric-like film to form the optical recording media. When a spot on the dielectric-like film is exposed to a focused laser the coloration thereof changes to store multiple bits of information at a single spot.

20 Claims, 1 Drawing Sheet

OPTICAL RECORDING MEDIA WITH THERMAL INSULATION AND METHOD OF MAKING THE MEDIA

TECHNICAL FIELD

The present invention relates to an optical recording media for mass data storage and to a method of making the media. More particularly, the present invention relates to an optical recording media which includes a thermally insulating film disposed between a metal film coated substrate and a dielectric-like film which changes its coloration when exposed to a focused laser to store data.

BACKGROUND OF THE INVENTION

Advances in laser source technology and in optical recording systems have brought about a great demand for a reliable optical recording media which is suitable as a data storage device. To be suitable as a data storage device, the optical recording media should have high sensitivity to a laser for recording data; good signal to noise ratio on playback; no degradation on repeated playback; durability under normal operating conditions; a resolution of one micron or better; a low bit error rate; and manufactureability at low cost.

Known optical recording medias have been made of tellurium films. Although tellurium films have adequate sensitivity to a laser for recording data, these films degrade rapidly under normal operating conditions. In order to prolong the life of tellurium optical recording medias, alloys of tellurium have been developed. Tellurium alloys, however, have been found to be insufficiently sensitive to a laser for recording data. Tellurium films have also been enclosed in an inert gas sandwich in order to increase its durability. However, the cost of making an optical recording disc from the sandwiched tellurium is prohibitively expensive.

In a copending U. S. patent application, Ser. No. 771,252, filed Aug. 30, 1985, an optical recording media is disclosed which overcomes the above problems. The optical recording media is formed by coating a substrate with a metal film; oxidizing a layer of the metal film; and depositing a dielectric-like film on the oxidized layer. When exposed to a focused laser, the coloration of the dielectric-like film changes to store data. Although this media is sensitive to a laser for recording data when the laser's pulse length is very short, that is, on the order of a few nanoseconds, when the laser's pulse length is longer, heat conduction from the metal film coating the substrate degrades the media's sensitivity.

Multi-layer optical recording medias have been proposed which include a spacing film disposed between two metal films wherein the spacing film has low heat conductivity. However, in these medias the thickness of not only the top metal film, but of the spacing layer is critical for recording. The thickness of the spacing layer must be an a (2N+1) multiple of the quarter wavelength of the laser light used in recording wherein N is 0 or a positive integer. Any variations in the thickness of either the top metal film or the spacing film will result in variations in the recording sensitivity of the media. Further, when such spacing films are used, the top metal film is made very thin such as on the order of 50 angstroms resulting in an optical recording media which has poor durability and a high error rate.

SUMMARY OF THE INVENTION

In accordance with the present invention, the disadvantages of prior optical recording medias as discussed above have been overcome. The optical recording media of the present invention includes a thermally insulating film to minimize heat loss wherein the thickness of this film is not critical.

The thermally insulating film is disposed between a metal film coated substrate and a dielectric-like film to form the optical recording media. When exposed to a focused laser, the coloration of the dielectric-like film changes to store data, the thermally insulating film minimizing heat loss during the recording process. Because light absorption during recording takes place in the dielectric-like film itself, the thickness of the insulating film is not critical and need not be an integer multiple of the half-wavelength of the laser light used in recording. Further, the thickness of the dielectric-like film need not be reduced when used with the insulating film of the present invention so that the durability of the optical recording media is not impaired.

A protective coating layer may be formed on the dielectric-like film to increase the durability of the recording media. Because the recording process involves a change in the coloration of the dielectric-like film the protective coating layer does not impair the sensitivity of the media as in prior optical recording medias.

The optical recording media of the present invention is highly sensitive, nonablative, easily manufactured at low cost, durable and has a low bit error rate. The media is further capable of storing multiple bits of data at a single spot. These and other objects and advantages of the invention, as well as the details of an illustrated embodiment, will be more fully understood from the following description and the drawings.

BEST MODE FOR CARRYING OUT THE INVENTION

Figure 2:
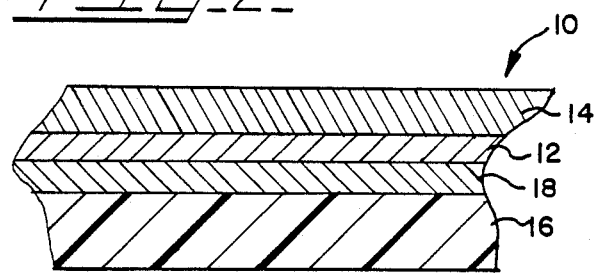
FIG. 2 is a cross-sectional view of the optical recording media of the present invention.

The optical recording media of the present invention, as shown in FIG. 2, includes a thermally insulating film 12 disposed between a dielectric-like film 14 and a substrate 16 having a metal film 18 deposited thereon, the thermally insulating film minimizing heat loss during the recording operation.

Figure 1:
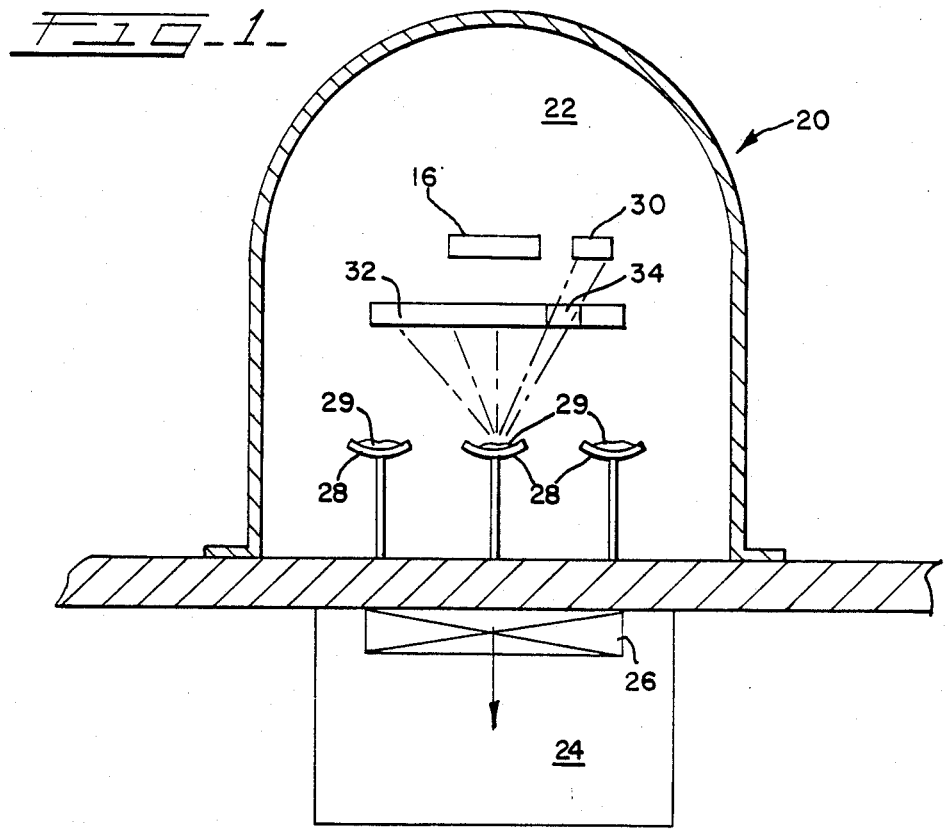
FIG. 1 is a cross-sectional view of a high vacuum system used to form the optical recording media of the present invention.

In order to form the optical recording media 10, the substrate 16, which may be made of glass, plastic or metal, is placed in a high vacuum system 20 shown in FIG. 1 so that the metal film 18 may be deposited thereon by thermal evaporation. The vacuum system 20 includes a chamber 22 which is evacuated by a pumping station 24 through a valve 26. The substrate 16 is positioned within the evacuated chamber 22 with respect to one or more thermal evaporation boats 28. The boats 28 are typically made of tungsten and are electrically heated by a power supply, not shown, to thermally evaporate the material 29 carried thereon to coat the substrate 16. A quartz thickness monitor 30 is positioned adjacent to the substrate 16 in order to monitor the evaporation rate of the material 29 and the thickness of the coating layer during the process. A shutter 32 having a hole 34 therein allows the material 29 to evaporate and coat the thickness monitor while protecting the substrate 16. When the desired evaporation rate is obtained, as determined by the quartz thickness monitor 30, the shutter 32 is opened to allow the substrate 16 to be coated by the material 29.

The thickness of the metal film 18 evaporated onto the substrate 16 should be such as to provide a highly reflective surface and may vary from several hundred angstroms to several thousand angstroms. The metal film 18 may be such as aluminum, or an alloy such as Pb-In-Au. Other metals such as niobium may further be used, these metals being deposited by conventional sputtering techniques to form the metal film 18 on the substrate 16.

The thermally insulating film 12 is next formed by depositing an amorphous material onto the metal film coated substrate. An amorphous material must be used to form the thermally insulating film if the dielectric-like film is to be deposited directly on top thereof. The amorphous material allows a dielectric-like film to be formed having particular properties as described below. The high vacuum system 20 may be used to form the thermally insulating film by thermal evaporation of a polymer or of inorganic materials such as SiO, $SiO_2$, $Al_2O_3$ or the like. The thermally insulating film 12 may also be made of a Teflon-like film formed by electron-beam evaporation, thermal evaporation or plasma chemical vapor deposition. Further, the thermally insulating film 12 may be a spun-on film, such as PMMA (polymethylmethcalyte), Az 1350, polyimide, or various other polymer films.

To form a thermally insulating film of Az 1350, the substrate 16 is removed from the high vacuum system 20 after the metal film 18 is deposited thereon. A solution of one part Az 1350 and three parts thinner is then spun-on the metal film 18 at a speed of 2000 r.p.m. for a period of 60 seconds. The substrate is then baked in an oven at 90 degrees for one hour to form the thermally insulating film which may be approximately 1500 angstroms thick.

After the thermally insulating film 12 is deposited on the metal film 18, the dielectric-like film 14 is formed. Because the thermally insulating film 12 is amorphous, the dielectric-like film 14 may be formed on top thereof in a particular structure which can trap light for coloration as discussed in detail in the copending U.S. patent application Ser. No. 771,252 filed Aug. 30, 1985. The dielectric-like film 14 may be a metal or metal alloy film, preferably having a low melting point. The dielectric-like film exhibits optical properties similar to a dielectric material. Unlike a dielectric material, however, the dielectric-like film is highly absorbent and when it is subjected to localized heating by a laser or the like, changes its coloration. When exposed to various amounts of laser radiation, the dielectric-like film 14 may change colors, for example, from red to gold to blue to a reflective metallic. The dielectri-like film 14 may contain lead, lead and indium, lead and gold; or lead, indium and gold for example as described below.

In order to form the dielectric-like film 14, the substrate is placed in the chamber 22 of the high vacuum system 20 and the pressure therein is adjusted to $5 \times 10^{-6}$ torr or below. An inert gas, such as argon, is then leaked into the vacuum chamber 22 to bring its pressure to within the range of $5 \times 10^{-3}$ torr - $500 \times 10^{-3}$ torr, a pressure of $40 \times 10^{-3}$ torr being preferred. When the pressure in the vacuum chamber is stabilized, lead carried on the thermal evaporation boats 28 is thermally evaporated onto the insulating film 12 at the rate of 2-25 Å/sec. to form a layer of lead, a rate of 10 Å/sec. being preferred. Thereafter, indium and/or gold may be thermally evaporated onto the lead covered substrate at a rate of 2-25 Å/sec. for indium and a rate of approximately 1-10 Å/sec. for gold, the preferred rate for indium being 10 Å/sec. The deposition angle for each of the lead, indium and gold is preferably zero wherein the evaporation boats are placed approximately fifteen inches from the substrate 16. Although the thickness of the dielectric-like film 14 may vary, a typical film may consist of 650 Å of lead, 200 Å of indium and 20 Å of gold.

The dielectric-like film 14 may also be formed of two layers of lead and indium as follows. First, 612 Å of lead is deposited on the thermally insulating film 12 and thereafter 135 Å of indium is deposited on the lead. Next, another layer of lead and indium is formed by depositing 670 Å of lead and thereafter 132 Å of indium to provide a thermally insulating layer 12 having a thickness of 1549 Å.

After the dielectric-like film is formed, a protective coating layer of 1000 Å of SiO may be deposited thereon, such as by thermal evaporation or electron-beam evaporation. Preferably, the layer of SiO is deposited at an oblique angle so that the sensitivity of the dielectric-like film is maintained. This protective layer will increase the durability of the optical recording media.

In order to store data, the optical recording media 10 is exposed to a focused laser which provides localized heating of the spot on the media at which the laser beam is focused. Upon heating the dielectric-like film to various degrees, the color of the film will change, for example, from red to gold to blue and finally to a metallic which is highly reflective. Because the color of the dielectric-like film may be varied depending on the amount of laser exposure, one spot on the optical recording media can define multiple bits of information. For example, the color red, may represent the bits 001, the color gold may represent the bits 010, the color blue may represent the bits 011 and the metallic color may represent the bits 100. Because a single spot on the optical recording media of the present invention can represent multiple bits of information, the optical recording media is capable of storing a much larger amount of data than has heretofore been possible by prior optical recording medias.

During the recording process, the thermally insulating film 12 minimizes heat loss due to conduction in the metal film 18 so that as much heat as possible from the laser is available for recording data. Because heat loss is minimized, the sensitivity of the optical recording media is greatly increased. Further, because the thermally insulating film is used in combination with a dielectric-like film to form the recording media, the thickness of the insulating film is not critical to the recording process. It is the dielectric-like film which absorbs the laser for recording as opposed to the insulating film so that the thickness of the insulating film need not be limited to an integer multiple of the half-wavelength of the laser light used in recording.

I claim:

1. A method of making an optical recording media formed of a composite film having changeable coloration comprising the steps of:

depositing a metal film on a substrate by thermal evaporation in a high vacuum system;

forming a thermally insulating film on the metal film, said thermally insulating film being made of an amorphous material;

forming a dielectric-like film on said thermally insulating film, the coloration of the dielectric-like film changing when subjected to localized heat by a laser.

2. The method of claim 1 wherein the step of forming said thermally insulating film includes the step of depositing an inorganic oxide film onto the metal film coated substrate in a vacuum.

3. The method of claim 1 wherein the step of forming said thermally insulating film includes the step of depositing a polymer film onto the metal film coated substrate in a vacuum.

4. The method of claim 1 wherein the step of forming said thermally insulating film includes the step of depositing a Teflon-like film onto the metal film coated substrate by electron beam evaporation.

5. The method of claim 1 wherein the step of forming said thermally insulating film includes the step of depositing a Teflon-like film onto the metal film coated substrate by thermal evaporation.

6. The method of claim 1 wherein the step of forming said thermally insulating film includes the step of depositing a Teflon-like film onto the metal film coated substrate by plasma chemical vapor deposition.

7. The method of claim 1 wherein the step of forming said thermally insulating film includes the step of spinning a film of PMMA onto the metal film coated substrate.

8. The method of claim 1 wherein the step of forming said thermally insulating film includes the step of spinning a film of polyimide onto the metal film coated substrate.

9. The method of claim 1 wherein the step of forming the dielectric-like film on said thermally insulating film includes the step of depositing a second metal film by thermal evaporation in a vacuum in the presence of an inert gas.

10. The method of claim 1 further including the step of coating the dielectric-like film with a protective layer.

11. The method of claim 10 wherein the coating step includes depositing a film of SiO on the dielectric-like film by thermal evaporation.

12. The method of claim 10 wherein the coating step includes depositing a film of SiO on the dielectric-like film by sputtering.

13. The method of claim 10 wherein the coating step includes depositing a film of SiO on the dielectric-like film by electron beam evaporation.

14. A method of forming an optical data storage device comprising the steps of:

depositing a metal film on a substrate by thermal evaporation in a high vacuum system;

forming a thermally insulating film on the metal film said thermally insulating film being made of an amorphous material;

forming a dielectric-like film on the thermally insulating film to form an optical recording media; and exposing a spot on the optical recording media to a focused laser to change the coloration of said spot to store data.

15. The method of claim 14 wherein the step of exposing the media to a laser includes the step of storing multiple bits of information at the spot exposed to the laser.

16. The method of claim 14 wherein the step of exposing the media to a laser includes focusing the laser on a spot of the optical recording media to change the coloration of the spot, the color of the spot representing multiple bits of information.

17. The method of claim 16 wherein the optical recording media is exposed to a laser to change the coloration of the media to red.

18. The method of claim 16 wherein the optical recording media is exposed to a laser to change the coloration of the media to gold.

19. The method of claim 16 wherein the optical recording media is exposed to a laser to change the coloration of the media to blue.

20. The method of claim 16 wherein the optical recording media is exposed to a laser to change the coloration of the media to metallic.

* * * * *